No. 794,421. PATENTED JULY 11, 1905.
E. L. McKINNON.
CURD AGITATOR.
APPLICATION FILED APR. 13, 1904.
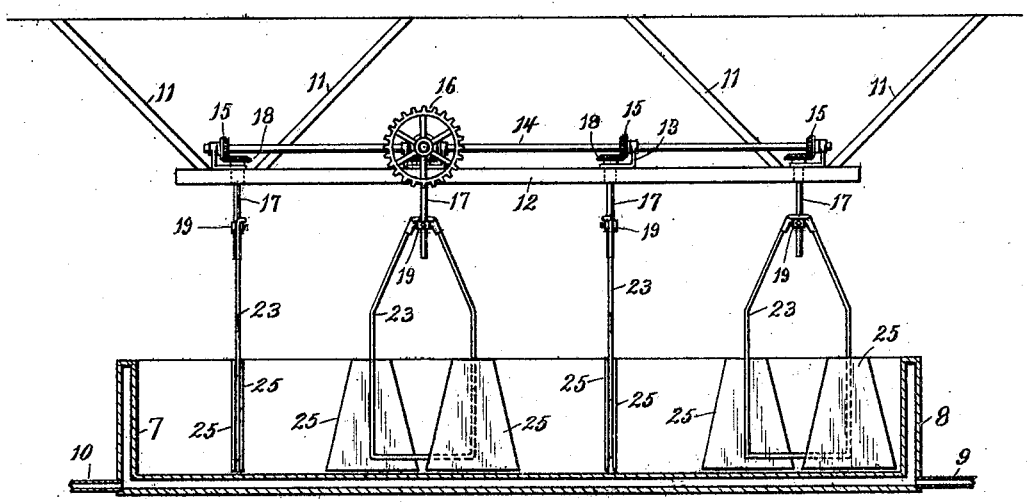
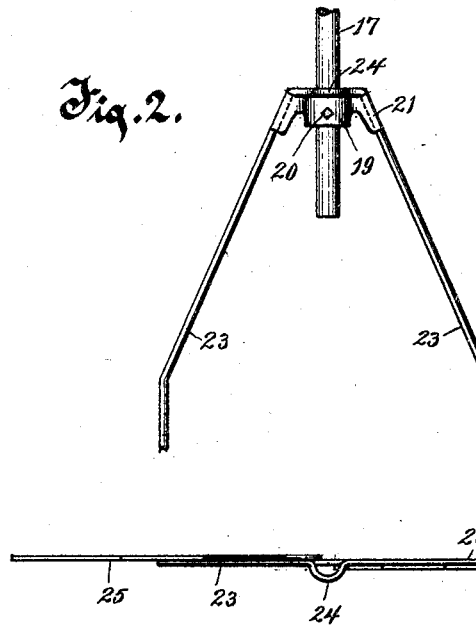
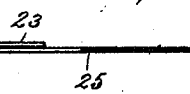
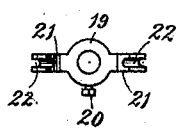
Witnesses. Inventor.
Elmer L. McKinnon
By Benedict & Morsell
Attorneys.

No. 794,421.

Patented July 11, 1905.

UNITED STATES PATENT OFFICE.

ELMER L. McKINNON, OF SHEBOYGAN FALLS, WISCONSIN.

CURD-AGITATOR.

SPECIFICATION forming part of Letters Patent No. 794,421, dated July 11, 1905.

Application filed April 13, 1904. Serial No. 202,901.

*To all whom it may concern:*

Be it known that I, ELMER L. MCKINNON, residing in Sheboygan Falls, in the county of Sheboygan and State of Wisconsin, have invented new and useful Improvements in Curd-Agitators, of which the following is a description, reference being had to the accompanying drawings, which are a part of this specification.

This invention relates to certain new and useful improvements in curd-agitators, and has for its object to provide means for mechanically stirring curd during the process of manufacturing cheese.

In the manufacture of cheese it is usual to add a rennet or acid to milk contained in a large vat, so as to coagulate the milk and produce a curd thereof. It is necessary to cook the curd, and for this purpose it is cut in pieces, desirably of the same size, and subjected to heat, and in order that it shall not stick to the vat during the cooking process it is customary to stir the cooking mass by hand.

The object of the present invention is to substitute for the crude method of stirring the curd by means of a rake or other similar implement a mechanism for mechanically effectively stirring the curd and preventing its sticking to the vat.

Another object of this invention is to provide such a stirring mechanism with agitating means which will produce a greater effect at the bottom of the vat than at the surface of the material being treated, whereby the greatest effect will be produced at the bottom of the vat, where the tendency for the curd to accumulate is the greatest and the splashing at the surface of the liquid is avoided.

A further object of this invention is to provide a curd-agitator with stirring-frames which are capable of being quickly attached or removed from the means for driving them, and to produce such stirring-frames of a novel and efficient construction.

With the above and other objects in view the invention consists in the devices and parts and their equivalents, as hereinafter set forth.

In the accompanying drawings, in which like characters of reference indicate the same parts in the several views, Figure 1 is a sectional elevation of a cheese-making vat with a curd-agitator coöperating therewith and embodying the present invention. Fig. 2 is an elevation of the connection made between the stirring-frames and their operating-shafts. Fig. 3 is a plan view of a stirring-frame, and Fig. 4 is a plan view of the connecting-bracket for the stirring-frame.

In the drawings, 7 represents a vat which may be of any usual construction, and as here shown is provided with a heating-jacket 8, which is supplied with a heating medium, such as steam, by means of the inlet and outlet pipes 9 and 10, respectively, which are usually provided with means for controlling the admission of steam to the heating-jacket of the vat, and thereby regulate the temperature of the material operated upon within the vat.

Mounted above the vat 7, preferably by braces 11, connected with the ceiling, is a frame 12, which has secured thereon several bracket-bearings 13, in which is journaled a drive-shaft 14, carrying beveled gears 15, and said shaft 14 is driven in any suitable manner, such as by the gear-wheel 16, in connection with a source of power. (Not shown.)

Journaled in the bracket-bearings 13 are also a series of vertical shafts 17, which extend through the frame 12 and carry on their upper ends beveled gears 18 to mesh with the beveled gears 15 on the drive-shaft. Near their lower ends the vertical shafts 17 have adjustably mounted thereon suitable yokes or brackets 19, having set-screws 20 to secure them in their adjusted positions on the shafts 17 and provided with oppositely-disposed depending divergent arms 21, which are provided with grooves 22 in their upper surfaces.

Stirring-frames are provided which comprise the looped portions 23, formed of heavy wire or metal rod, with rectangular lower ends and tapering upper ends, which upper ends are given a bend 24 to avoid the shaft 17 when the contracting members of the upper end portion of the loop are seated in the grooves 22 of the yoke-arms 21. This permits of the loop hanging from the yoke 19 in a plane including the shaft 17, but securely connected with the shaft, so that the rotations of the shaft will be imparted to the loop.

At the lower ends of each loop 23 are secured in any suitable manner a pair of stirring-blades 25, which are preferably of an isosceles triangular shape, the apex of the triangle being truncated, and the two blades are arranged on opposite sides of the loop, at the lower corners thereof, so as to travel in advance of the corners of the loops 23, to which they are attached.

The several shafts 17 are arranged at such a distance apart that the course of rotation of the blades 25 of one stirring-frame 23 will overlap the course of rotation of the blades of the next stirring-frame 23; but the yokes 19 are so arranged on the shafts 17 that the planes of the adjacent stirring-frames are approximately at right angles to each other, so that their blades do not conflict in their movements.

The stirring-blades 25 being of the tapering shape, with their larger portions at the bottom, serve to more effectually clear the bottom of the vat of the curd which has the tendency to settle there, while producing less agitation at the surface of the liquid, so that the liquid will not be splashed over the sides of the vat. Furthermore, the overlapping of the course of the blades of adjacent stirring-frames insures the more complete covering by the frames of the surface of the vat-bottom, and thereby effectively prevent the curd sticking thereto.

By the particular form of connection between the shafts 17 and the stirring-frames the said frames are quickly and easily removable when the cooking operation is completed by lifting them bodily from the yokes 19 and when desired may be readily replaced in position, when they will again be held operatively by the yokes. When it is desired to raise or lower the stirring-frames 23 to increase or diminish the distance between their blades 25 and the bottom of the vat, the yokes 19 may be adjusted on the shafts 17 by loosening the set-screws 20 and sliding the yokes on the shafts, and when the desired position is reached the yokes 19 may be again secured to the shafts 17 by tightening said set-screws.

It is to be understood that the invention is not limited to any particular form of vat or to any particular means for heating the same, as it is applicable to any form of vat heated in any desirable manner. Furthermore, I do not wish to be limited to the particular method of supporting the frame 12 as shown and described herein, for it is obvious that such frame may be supported from the vat in any other desirable manner without affecting the operation of the invention.

What I claim as my invention is—

1. In a curd-agitator, a stirring-frame comprising a loop formed of a continuous wire bent at right angles at its lower end and bent to form a catch at its upper end, driving means to which the loop may be attached by means of the catch, and blades secured on opposite sides of the loop at the angles of its bottom portion, said blades having tapering side edges so that their upper ends are smaller than their lower ends and thereby produce less agitation at the surface of the material acted upon.

2. In a curd-agitator, a vat, a frame suspended at such a distance above the vat that the contents of the vat are freely accessible, angular brackets mounted on the frame, a horizontal shaft journaled through the brackets and having beveled pinions thereon, vertical shafts journaled in the brackets and having beveled pinions meshing with the beveled pinions of the horizontal shaft, yokes vertically adjustable on the depending ends of the vertical shafts and having diverging inclined arms with grooves on their upper surfaces, and stirrers detachably connected to the yokes and comprising loops formed of a continuous wire bent at its upper portion to form a catch for engaging in the grooves of the yoke-arms and having its lower end bent at right angles, and blades secured to the said angular portions of the lower end on opposite sides thereof, each blade having support from a vertical and a horizontal portion of the loop and being tapering in width from the lower end to the upper end so as to produce less agitation at the surface of the material operated upon than at the bottom of the vat.

In testimony whereof I affix my signature in presence of two witnesses.

ELMER L. McKINNON.

Witnesses:
JNO. E. THOMAS,
H. E. THOMAS.